United States Patent
Be'ery et al.

(10) Patent No.: US 9,614,861 B2
(45) Date of Patent: Apr. 4, 2017

(54) MONITORING THE LIFE CYCLE OF A COMPUTER NETWORK CONNECTION

(71) Applicant: Microsoft Technology Licensing, LLC., Redmond, WA (US)

(72) Inventors: Tal Arieh Be'ery, Petach Tikva (IL); Itai Grady, Ramat Hasharon (IL); Idan Plotnik, Savion (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 19 days.

(21) Appl. No.: 14/836,576

(22) Filed: Aug. 26, 2015

(65) Prior Publication Data

US 2017/0063882 A1    Mar. 2, 2017

(51) Int. Cl.
| H04L 29/06 | (2006.01) |
| H04L 12/26 | (2006.01) |
| H04L 29/12 | (2006.01) |

(52) U.S. Cl.
CPC .......... *H04L 63/1408* (2013.01); *H04L 43/04* (2013.01); *H04L 43/067* (2013.01); *H04L 43/0811* (2013.01); *H04L 43/106* (2013.01); *H04L 61/2007* (2013.01); *H04L 63/1416* (2013.01); *H04L 63/1425* (2013.01)

(58) Field of Classification Search
CPC .................................................. H04L 63/1408
See application file for complete search history.

(56) References Cited

U.S. PATENT DOCUMENTS

| 5,812,749 A | 9/1998 | Fernandez et al. |
| 6,044,402 A * | 3/2000 | Jacobson ............ H04L 12/2602 709/224 |

(Continued)

FOREIGN PATENT DOCUMENTS

| CN | 101242317 A | 8/2008 |
| CN | 102571911 B | 11/2014 |
| JP | 2005051470 A | 2/2005 |
| KR | 20120026738 A | 3/2012 |

OTHER PUBLICATIONS

Perez et al.; G-Sense: a scalable architecture for global sensing and monitoring; Published in: IEEE Network ( vol. 24, Issue: 4, Jul.-Aug. 2010 ); Date of Publication: Jul. 19, 2010; IEEE Xplore.*

(Continued)

*Primary Examiner* — Bradley Holder
(74) *Attorney, Agent, or Firm* — Merchant & Gould

(57) ABSTRACT

Monitoring of a life cycle of a connection of a network client device to a network via monitoring time synchronization traffic flowing between one or more network client devices and a time server in a network is provided. A system for monitoring a life cycle of a connection of a network client device to a network includes a security device operable to identify a true identity of the one or more network client devices, identify a network client device's connections to and disconnections from the network, determine which network client devices have been associated with a particular internet protocol (IP) address, and generate an output of connection and disconnection information associated with a network client device. In some examples, the security device is operable to detect anomalies and malicious patterns in the network.

20 Claims, 8 Drawing Sheets

(56) References Cited

U.S. PATENT DOCUMENTS

| | | | | |
|---|---|---|---|---|
| 6,430,711 | B1* | 8/2002 | Sekizawa | G06F 11/3006 358/1.14 |
| 6,651,099 | B1 | 11/2003 | Dietz et al. | |
| 7,236,126 | B2 | 6/2007 | Jeon et al. | |
| 7,406,516 | B2* | 7/2008 | Davis | G06F 11/3495 709/224 |
| 7,539,777 | B1 | 5/2009 | Aitken | |
| 7,593,351 | B1 | 9/2009 | Zioulas et al. | |
| 7,843,899 | B2* | 11/2010 | Burritt | H04Q 3/0087 370/352 |
| 8,451,867 | B2 | 5/2013 | Dowd | |
| 8,774,056 | B2 | 7/2014 | Lueckenhoff et al. | |
| 9,329,973 | B2* | 5/2016 | Bhuyan | G06F 11/36 |
| 2002/0026589 | A1* | 2/2002 | Fukasawa | G06F 11/3423 726/4 |
| 2002/0095627 | A1* | 7/2002 | Kitamura | G06F 11/0751 714/51 |
| 2002/0198988 | A1* | 12/2002 | Hirose | H04L 12/2602 709/224 |
| 2005/0123137 | A1* | 6/2005 | McCallum | G06F 21/10 380/255 |
| 2006/0160395 | A1* | 7/2006 | Macauley | H04Q 1/136 439/344 |
| 2011/0185421 | A1 | 7/2011 | Wittenstein et al. | |
| 2012/0005063 | A1* | 1/2012 | Moitoso | G06Q 40/04 705/37 |
| 2014/0122708 | A1* | 5/2014 | Bartlett | H04L 41/5009 709/224 |
| 2015/0071308 | A1 | 3/2015 | Webb et al. | |

OTHER PUBLICATIONS

Sen et al.; Can they hear me now?: a case for a client-assisted approach to monitoring wide-area wireless networks; Published in: Proceeding IMC '11 Proceedings of the 2011 ACM SIGCOMM conference on Internet measurement conference; pp. 99-116; ACM Digital Library.*

Li, et al., "Using Network Time Protocol (NTP): Introduction and Recommended Practices", In Proceedings of International SEMATECH Manufacturing Initiative, Feb. 28, 2006, 34 pages.

"Network Time Protocol: Best Practices White Paper", Retrieved on: Jun. 2, 2015, 31 pages. Available at: http://www.cisco.com/c/en/us/support/docs/availability/high-availability/19643-ntpm.html#ntpcritnodereport.

"IBM—System I Networking Simple Network Time Protocol", Published on: Apr. 30, 2014, 22 pages. Available at: http://www-01.ibm.com/support/knowledgecenter/ssw_ibm_i_71/rzakt/rzakt.pdf.

International Search Report and Written Opinion for Application No. PCT/US2016/045446 mailed Oct. 28, 2016.

RID Pool Request, Retrieved from the Internet: https://technet.microsoft.com/en-us/library/cc756394%28d=printer, w=ws.10%29.aspx, 1 page (Nov. 25, 2009).

Sun, J. et al., "High Precision Time Synchronization Scheme for Distributed Intrusion Detection System," 2010 International Conference on Computer Application and System Modeling (ICCASM 2010), pp. V2-219-V2-223 (2010).

\* cited by examiner

MONITORING THE LIFE CYCLE OF A COMPUTER NETWORK CONNECTION

BACKGROUND

In a networked directory services environment, various components are used for authenticating users and for generating authorization data for controlling access to network resources to provide secure network access to network data by authorized users and that rejects access by unauthorized users. A breach in security in a networked directory services environment can result in a loss of network resource access by legitimate clients or in the disclosure of potentially sensitive information. Such information disclosure can occur for data that is stored on network resources or from the networked directory services database itself. Detection of anomalies in network traffic or malicious patterns may be indicative of a breach in security in a networked directory services environment.

SUMMARY

This summary is provided to introduce a selection of concepts in a simplified form that are further described below in the Detailed Description section. This summary is not intended to identify key features or essential features of the claimed subject matter, nor is it intended as an aid in determining the scope of the claimed subject matter.

Aspects are directed to an automated system and method for monitoring a life cycle of a connection of a network client device to a network. A computer network connection life cycle monitoring system comprises a security device operable to monitor time synchronization traffic flowing between the one or more network client devices and a time server in a network. The security device is operable to identify a true identity of the one or more network client devices, identify a network client device's connections to and disconnections from the network, determine which network client devices have been associated with a particular internet protocol (IP) address, and generate an output comprising connection and disconnection information associated with the one or more network client devices. According to an aspect, the security device is operable to detect anomalies and malicious patterns in the network.

Examples are implemented as a computer process, a computing system, or as an article of manufacture such as a computer program product or computer readable media. According to an aspect, the computer program product is a computer storage media readable by a computer system and encoding a computer program of instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings.

DETAILED DESCRIPTION

Figure 1:
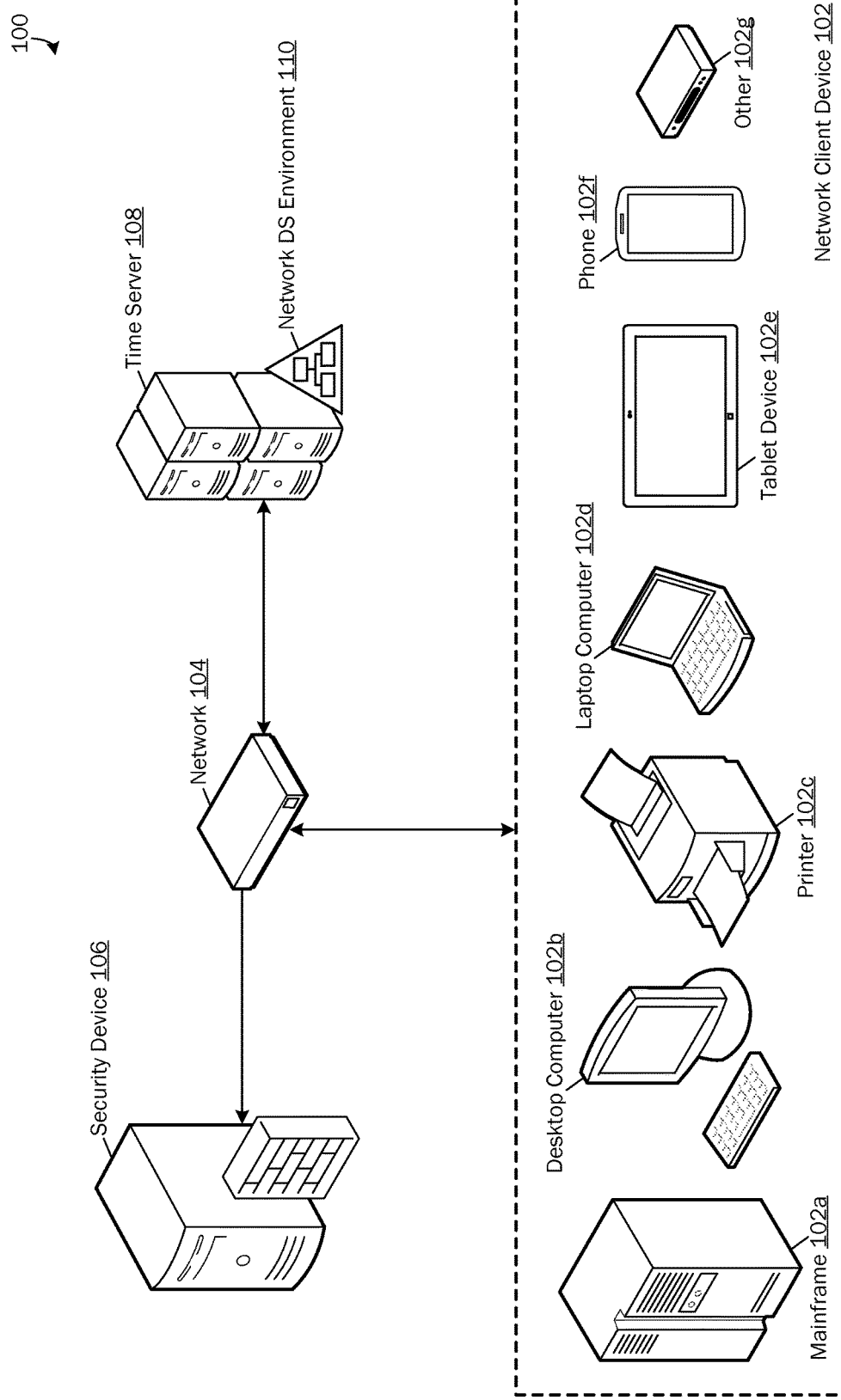
FIG. 1 is a simplified block diagram of a system for monitoring the life cycle of a connection to a computer network.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

Aspects of the present disclosure are directed to monitoring the life cycle of a connection to a computer network. FIG. 1 is a simplified block diagram of one example of a computer network connection life cycle monitoring system 100. According to an aspect, the computer network connection life cycle monitoring system 100 is adapted to be implemented in a networked directory services environment 110. An example of a networked directory services environment 110 is Active Directory® (AD) domain services, where secure, structured, hierarchical data storage for objects in a network 104 and support for locating and working with the objects are provided. As illustrated in FIG. 1, the system 100 comprises one or more network client devices 102a-g (collectively, 102). The one or more network client devices 102 are devices that are allowed to connect to the network 104 and that can be assigned permissions. For example, the one or more network client devices 102 may include a mainframe computer 102a, a desktop computer 102b, a printer 102c, a laptop computer 102d, a tablet device 102e, a phone 102f, or other resource or security principal object or entity in the network 104. As should be appreciated, examples are not limited to these example network client device 102 types. According to an aspect, the network 104 is a cloud-based network or a local network.

Within a networked directory services environment 110, clocks of the network client devices 102 in the network 104 are synchronized within a given accuracy range. According to an aspect, the clocks are synchronized to ensure consistent time throughout an enterprise. According to another aspect, time synchronization supports computer network authentication. For example, a computer network authentication protocol, such as Kerberos, which uses tickets to verify clients for gaining access to a service, is time-sensitive to a given clock skew. Through the use of encrypted tickets, secure authentication occurs when a client attempting to gain access to the service knows the secret key. Time stamp information is included in the tickets to prevent replay attacks (i.e., fraudulent representation of a previously issued ticket in order to gain unauthorized access). According to an example, network client devices 102 with an inaccurate clock attempting to authenticate will be failed in authentication attempts due to the time difference with an authentication server.

In some examples, a networked directory services environment 110 uses a networking protocol for time synchronization between computer systems over packet-switched, variable-latency data networks, such as network time protocol (NTP) or other similar implementation. According to an aspect, the time synchronization protocol used in the networked directory services environment 110 synchronizes network client device 102 clocks by using one or more designated time references, herein referred to as time servers 108. In some examples, domain controller machines that are part of a networked directory services environment 110 domain are automatically configured to act as time servers 108. In other examples, the time server 108 is a manually-specified time source.

Referring still to FIG. 1, the computer network connection life cycle monitoring system 100 further comprises a security device 106 operable to monitor time synchronization traffic flowing between the one or more network client devices 102 and the time server 108. According to an aspect, the security device 106 is a system, device, or collection of components or modules operating on a system or device operable to monitor time synchronization traffic flowing between the one or more network client devices 102 and the time server 108. According to an aspect and as will be described in detail below, by monitoring time synchronization traffic, the security device 106 is further operable to determine a network client device's identity. According to another aspect, the security device 106 is further operable to identify a network client device's connections to and disconnections from the network 104. According to another aspect, the security device 106 is further operable to determine which network client devices 102 have been associated with a particular internet protocol (IP) address.

By monitoring the time synchronization traffic flowing between the one or more network client devices 102 and the time server 108 and by monitoring the life cycle of a connection of a network client device 102 to the network 104, the security device 106 is enabled to detect network behavior anomalies and malicious patterns in the network 104, thus providing network security threat detection. According to aspects, time synchronization traffic monitoring for network security threat detection includes validation of network client devices' identities, and thus is not easily spoofed by an adversary.

The one or more network client devices 102, the time server 108, and the components of the security device 106 are illustrative of a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

According to aspects, the components of the security device 106 are illustrated in and described with reference to FIG. 2. As used herein, the term "component" represents an individual computing device having processing, memory and other computer operating components described below with reference to FIGS. 5-7 on which is hard coded operating instructions or with which is processed a set of computer-executable instructions for causing the component to perform the functions described for it herein. Alternatively, the term "component" represents a set of instructions executed by a computing device or system (FIGS. 5-7) for causing the component to perform the functions described for it herein. Each component described below may operate independently but communicatively with other components or each component may be integrated as a single operating module, device, or system (e.g., the security device 106, described herein).

Figure 2:
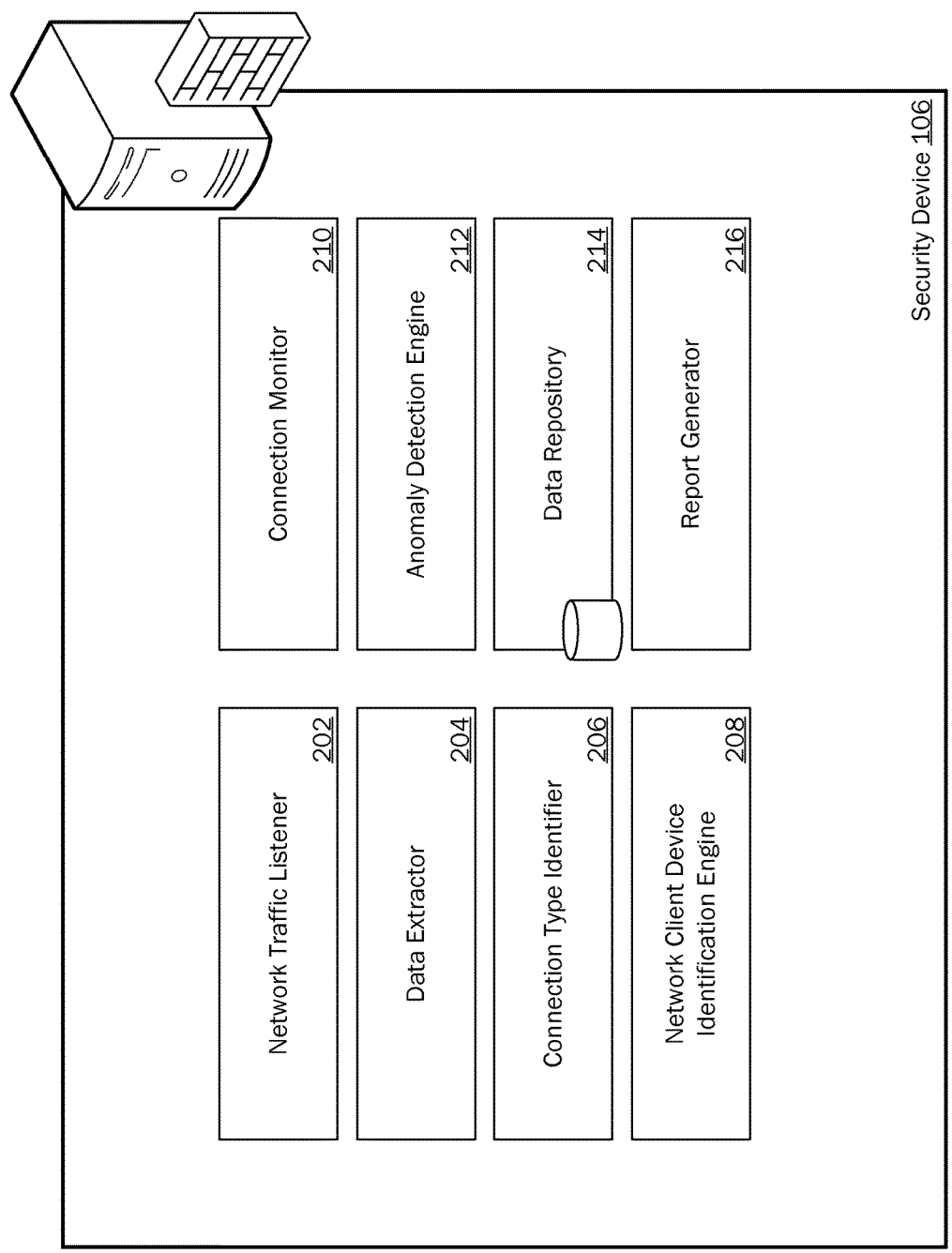
FIG. 2 is a simplified block diagram illustrating components of a security device for monitoring the life cycle of a connection to a computer network.

As illustrated in FIG. 2, the security device 106 comprises a network traffic listener 202, a data extractor 204, a connection type identifier 206, a network client device identification engine 208, a connection monitor 210, an anomaly detection engine 212, a data repository 214, and a report generator 216. The data repository 214 is illustrative of a general purpose data storage unit or system for storing data received by, accessed by, identified by, or determined by the network traffic listener 202, the data extractor 204, the connection type identifier 206, the network client device identification engine 208, the connection monitor 210, the anomaly detection engine 212, and the report generator 216 in association with the security device 106.

The network traffic listener 202 is illustrative of a software module, system or device operable to access and monitor time synchronization traffic flowing between the one or more network client devices 102 and the time server 108. Some implementations of networking protocols for time synchronization include: a network client device 102 sending a request with its current time and additional information including information on the last clock adjustment date and time to a time server 108; the time server 108 replying with the time sent by the network client device 102, the time the request was received according to the time server's clock, and the time the time server 108 sent its response; the network client device 102 computing the time server's time by estimating the round-trip-time; and the network client device 102 adjusting its clock accordingly. According to an example, the network traffic listener 202 passively monitors the time synchronization traffic (i.e., requests and responses) in a non-invasive manner. According to another example, the network traffic listener 202 actively solicits time synchronization traffic from a network client device 102 to a time server 108 on demand.

According to aspects, authenticity of the time synchronization networking protocol message exchange is protected with a signature based on a shared secret between the network client device 102 and the time server 108. So that it can be identified, the network client device 102 sends a unique identifier to the time server 108 with the request. In some examples, such as in a Microsoft® Windows® environment, the unique identifier is a relative identification (RID) value, wherein an RID value is an unsigned integer that is assigned to each security principal object (i.e., user, computer, and group) in a domain in a networked directory services environment 110 at creation, and uniquely identifies each object in the domain. When the time server 108 sends a response, it signs the response with a shared secret related to the network client device's unique identifier such that the network client device 102 can verify the authenticity of the response with the shared secret.

The data extractor 204 is illustrative of a software module, system or device operable to parse time synchronization networking protocol messages for extracting useful information. For example, the data extractor 204 extracts various values from a time synchronization networking protocol message including, but not limited to: a source address value (e.g., an internet protocol (IP) address of the network client device 102); an identifier that uniquely identifies the network client device 102 (e.g., the RID value); a domain identifier that uniquely identifies the domain of the network client device 102 (e.g., domain security identification (SID) value); a value indicating a level of the time server 108 in a hierarchy of time servers; the origin timestamp value; and the received timestamp value. According to an aspect, the data extractor 204 stores the extracted information in the data repository 214.

The connection type identifier 206 is illustrative of a software module, system or device operable to determine whether or not a time synchronization networking protocol request message is an initial request, for example, a request generated at a start/restart event, a connect/reconnect event, or other special event (e.g., domain join). According to an aspect, the connection type identifier 206 identifies a request as a request associated with an initial connection event when the reference clock identifier value (i.e., a code identifying a particular reference clock) is set to "null," the peer clock stratum value is set to unspecified, invalid, or 0, and the origin timestamp value (i.e., timestamp established by the network client device 102 specifying the time at which the request departed for the time server 108) and the receive timestamp value (i.e., timestamp established by the time server 108 specifying the time at which the request arrived from the network client device 102) are set to 0 (1.1.1970 Unix Time). According to an aspect, the connection type identifier 206 stores connection time information in the data repository 214.

Figure 3:
FIG. 3 is an example of a true identifier associated with network client device.
Figure 4:
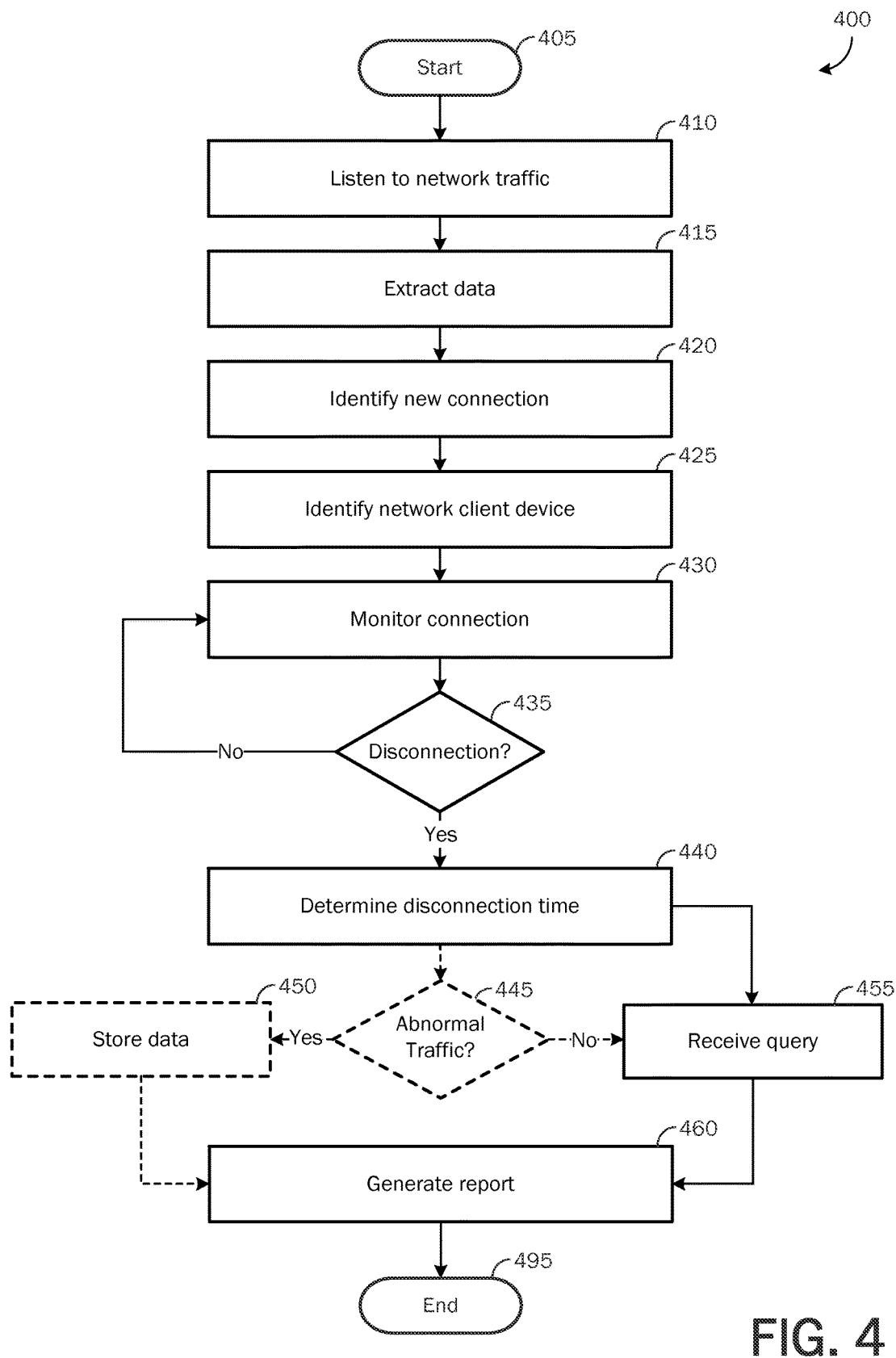
FIG. 4 is a flow chart showing general stages involved in an example method for monitoring the life cycle of a connection to a computer network.

The network client device identification engine 208 is illustrative of a software module, system or device operable to determine the true identity of the network client device 102. According to an example, the network client device identification engine 208 extracts the RID value from the time synchronization networking protocol message and the domain SID value from the target of the time synchronization networking protocol message. The network client device identification engine 208 is operable to determine the true identity of the network client device 102, which is the permanent identity of the device. According to an example, the true identity of a network client device 102 is a full security ID (SID) associated with the device. An example of a full SID 302 of a network client device 102 is illustrated in FIG. 3. According to an example, the full SID 302 of the network client device 102 comprises the domain SID value 304 and the RID value 306 of the network client device 102. The network client device identification engine 208 is further operable to associate the determined true identity of the network client device 102 with the identified IP address. According to an aspect, the network client device identification engine 208 stores the true identity of the network client device 102 and the associated IP address in the data repository 214.

According to an aspect, the network client device 102 continually polls the time server 108 for time synchronization according to a polling interval. The connection monitor 210 is illustrative of a software module, system or device operable to monitor the time synchronization traffic flowing between the network client device 102 and the time server 108 for time synchronization polling transactions. For example, the network client device 102 periodically sends a time synchronization networking protocol message to the time server 108, which then responds within some interval (i.e., polling interval). According to an example, the polling interval is included in the message transaction, which is monitored by the connection monitor 210.

The connection monitor 210 is further operable to determine when a network client device 102 is disconnected from the network 104. For example, when the polling interval has passed and the connection monitor 210 has not detected a time synchronization networking protocol message being sent from the network client device 102 to the time server 108, the connection monitor 210 determines that the network client device 102 is disconnected from the network 104. The connection monitor 210 is further operable to determine a disconnection time of the network client device 102 from the network 104. In some examples, the disconnection time is an estimate based on a range within the polling interval. According to an aspect, the connection monitor 210 stores disconnection time information in the data repository 214.

According to an aspect, when a network client device 102 reconnects to the network 104, the network client device 102 sends a time synchronization networking protocol message to the time server 108, wherein the time synchronization networking protocol message includes a timestamp of the time established by the time server 108 most recently used to update the clock of the network client device 102. In some examples, the timestamp value is included in a reference timestamp field in the time synchronization networking protocol message. With this timestamp value, the connection monitor 210 determines the last time the network client device 102 was connected to the network 104. According to an aspect, the connection monitor 210 stores reconnection time information in the data repository 214.

The anomaly detection engine 212 is illustrative of a software module, system or device operable to detect anomalies in the network traffic. According to an example, the anomaly detection engine 212 reviews connection, disconnection, and reconnection information associated with a network client device 102 based on the true identity of the network client device 102, and detects abnormal traffic behavior, for example, when a second network client device uses a same security token as a security token used on a first network client device 102, when a same network client device 102 is connecting on geographically-distanced networks too rapidly (e.g., below a predetermined time threshold), an abnormal number or frequency of connections, disconnections, and reconnections, a network client device 102 frequently changing its IP address, etc. According to another example, the anomaly detection engine 212 reviews connection, disconnection, and reconnection information associated with an IP address, and detects abnormal traffic behavior associated with the IP address. According to an aspect, abnormal behavior may indicate a network security attack, such as spoofing. According to an aspect, the anomaly detection engine 212 stores abnormal traffic behavior information in the data repository 214.

The report generator 216 is illustrative of a software module, system or device operable to generate an output of network client device 102 or network traffic information. According to an example, the report generator 216 is operable to generate a report of connection, disconnection, and reconnection information. For example, the report generator 216 is operable to generate a report comprising a record of connections and disconnections from the network 104. As another example, the report generator 216 is operable to generate a report comprising a record of network client devices 102 associated with a particular IP address.

According to an aspect, the report generator 216 generates a report in response to receiving a query. For example, the report generator 216 may receive a query about a specific network client device 102, and the report generator 216 generates a report comprising a listing of connections and disconnections associated with the network client device 102. As another example, the report generator 216 may receive a query about a particular IP address, and the report generator 216 generates a report comprising a listing of network client devices 102 associated with the IP address. According to an aspect, the report generator 216 is further operable to generate a report of abnormal traffic activity as determined by the anomaly detection engine 212.

Having described an operating environment and various aspects with respect to FIGS. 1-3, FIG. 4 illustrates a flow chart showing general stages involved in an example method for monitoring the life cycle of a connection to a computer network. The method 400 begins at start OPERATION 405 and proceeds to OPERATION 410, where the network traffic listener 202 listens to network traffic in a networked directory services environment 110. For example, the network traffic listener 202 accesses and monitors time synchronization traffic flowing between the one or more network client devices 102 and the time server 108.

The method 400 continues to OPERATION 415, where the data extractor 204 parses time synchronization networking protocol messages, and extracts useful information, for example, a source address value (e.g., an internet protocol (IP) address of the network client device 102); an identifier that uniquely identifies the network client device 102 (e.g., the RID value); a domain identifier that uniquely identifies the domain of the network client device 102 (e.g., domain security identification (SID) value); a peer clock stratum value; the origin timestamp value; and the received timestamp value. Also at OPERATION 415, the data extractor 204 stores the extracted information in the data repository 214.

The method 400 continues to OPERATION 420, where the connection type identifier 206 identifies the time synchronization networking protocol request message as an initial request (e.g., a request generated at a start/restart event, a connect/reconnect event, domain join event, etc.). As described above, the connection type identifier 206 identifies a request as an initial request when the reference clock identifier value (i.e., a code identifying a particular reference clock) is set to "null," the peer clock stratum value is set to unspecified, invalid, or 0, and the origin timestamp value (i.e., timestamp established by the network client device 102 specifying the time at which the request departed for the time server 108) and the receive timestamp value (i.e., timestamp established by the time server 108 specifying the time at which the request arrived from the network client device 102) are set to 0 (1.1.1970 Unix Time). According to an aspect, when a network client device 102 reconnects to the network 104, a timestamp of the time established by the time server 108 most recently used to update the clock of the network client device 102 is included in the time synchronization networking protocol request message. With this timestamp value, the connection monitor 210 determines the last time the network client device 102 was connected to the network 104, and stores reconnection time information in the data repository 214.

The method 400 proceeds to OPERATION 425, where the network client device identification engine 208 determines the true identity of the network client device 102. According to an example, the network client device identification engine 208 extracts the RID value from the time synchronization networking protocol message and the domain SID value from the target of the time synchronization networking protocol message, determines the full SID (i.e., true identity) of the network client device 102, and associates the determined true identity of the network client device 102 with the identified IP address. Also at OPERATION 425, the network client device identification engine 208 stores the true identity of the network client device 102 and the associated IP address in the data repository 214.

The method 400 proceeds to OPERATION 430, where the connection monitor 210 monitors the time synchronization traffic flowing between the network client device 102 and the time server 108 for time synchronization polling transactions according to the polling interval specified in the time synchronization networking protocol message.

At DECISION OPERATION 435, the connection monitor 210 monitors the time synchronization traffic for identifying a disconnection of a network client device 102 from the network 104. For example, at DECISION OPERATION 435, a determination is made as to whether the polling interval associated with a network client device 102 has passed and the connection monitor 210 has not detected a time synchronization networking protocol message being sent from the network client device 102 to the time server 108.

If a determination is made that the network client device 102 has disconnected from the network, the method 400 proceeds to OPERATION 440, where the connection monitor 210 determines a disconnection time of the network client device 102 from the network 104 according to an estimate based on the last polling request sent by the network client device 102 to the time server 108 and the polling interval. For example, if the last request sent by the network client device 102 occurred at 12:01:02.763054000 UTC, and the polling interval is 1024 seconds, the connection monitor 210 may estimate the time of disconnection within the range of 12:01:02.763054000 UTC and 12:18:06.763054000 UTC. The connection monitor 210 stores disconnection time information in the data repository 214.

The method 400 optionally proceeds to DECISION OPERATION 445, where the anomaly detection engine 212 reviews connection, disconnection, and reconnection information associated with an IP address or with a network client device 102 based on the true identity of the network client device 102, and determines whether there is abnormal traffic behavior, for example, when a second network client device uses a same security token as a security token used on a first network client device 102, when a same network client device 102 is connecting on geographically-distanced networks too rapidly (e.g., below a predetermined time threshold), an abnormal number or frequency of connections, disconnections, and reconnections of a network client device 102, a network client device 102 frequently changing its IP address, abnormal traffic behavior associated with an IP address, etc. If a determination is made that there is abnormal traffic behavior, the method proceeds from DECISION OPERATION 445 to OPERATION 450, where the anomaly detection engine 212 stores the abnormal traffic behavior information in the data repository 214.

If the method 400 does not proceed to DECISION OPERATION 445 from OPERATION 440, the method 400 continues to OPERATION 455, where a query is received by the report generator 216. For example, the report generator 216 may receive a query about a specific network client device 102, a query about a particular IP address, etc.

The method 400 continues to OPERATION 460, where the report generator 216 generates a report. If the method is continuing from OPERATION 450, the report generator 216 generates a report comprising abnormal traffic activity as determined by the anomaly detection engine 212. If the method is continuing from OPERATION 455, the report generator 216 generates a report comprising information associated with the received query. For example, if the report generator 216 receives a query about connection information associated with a specific network client device 102, the report generator 216 generates a report comprising a listing of connections and disconnections associated with the specific network client device 102. As another example, if the report generator 216 receives a query about connection information associated with a particular IP address, the report generator 216 generates a report comprising a listing of true identities of network client devices 102 associated with the IP address. The method 400 ends at OPERATION 495.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 5:
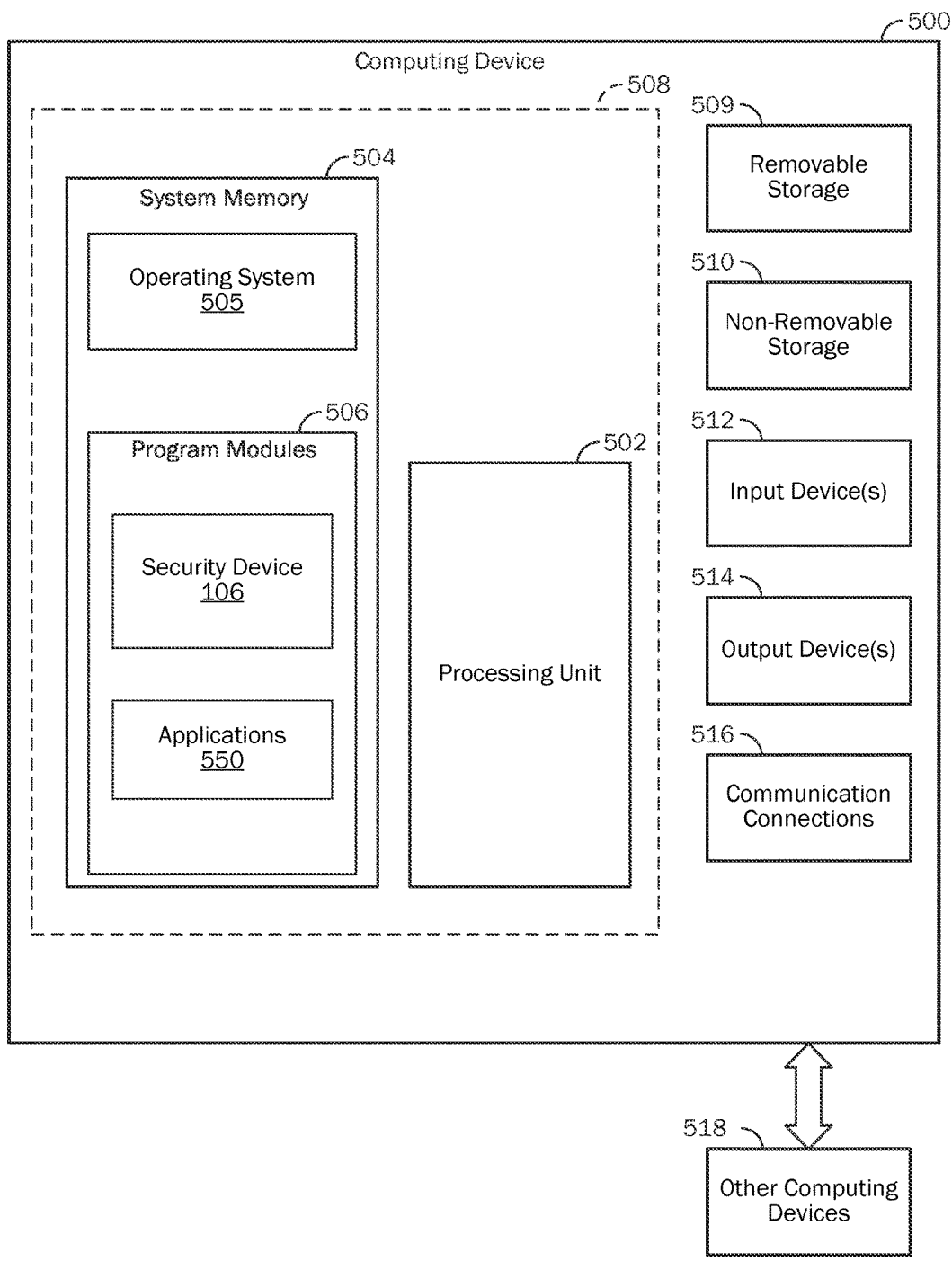
FIG. 5 is a block diagram illustrating example physical components of a computing device.
Figure 6A:
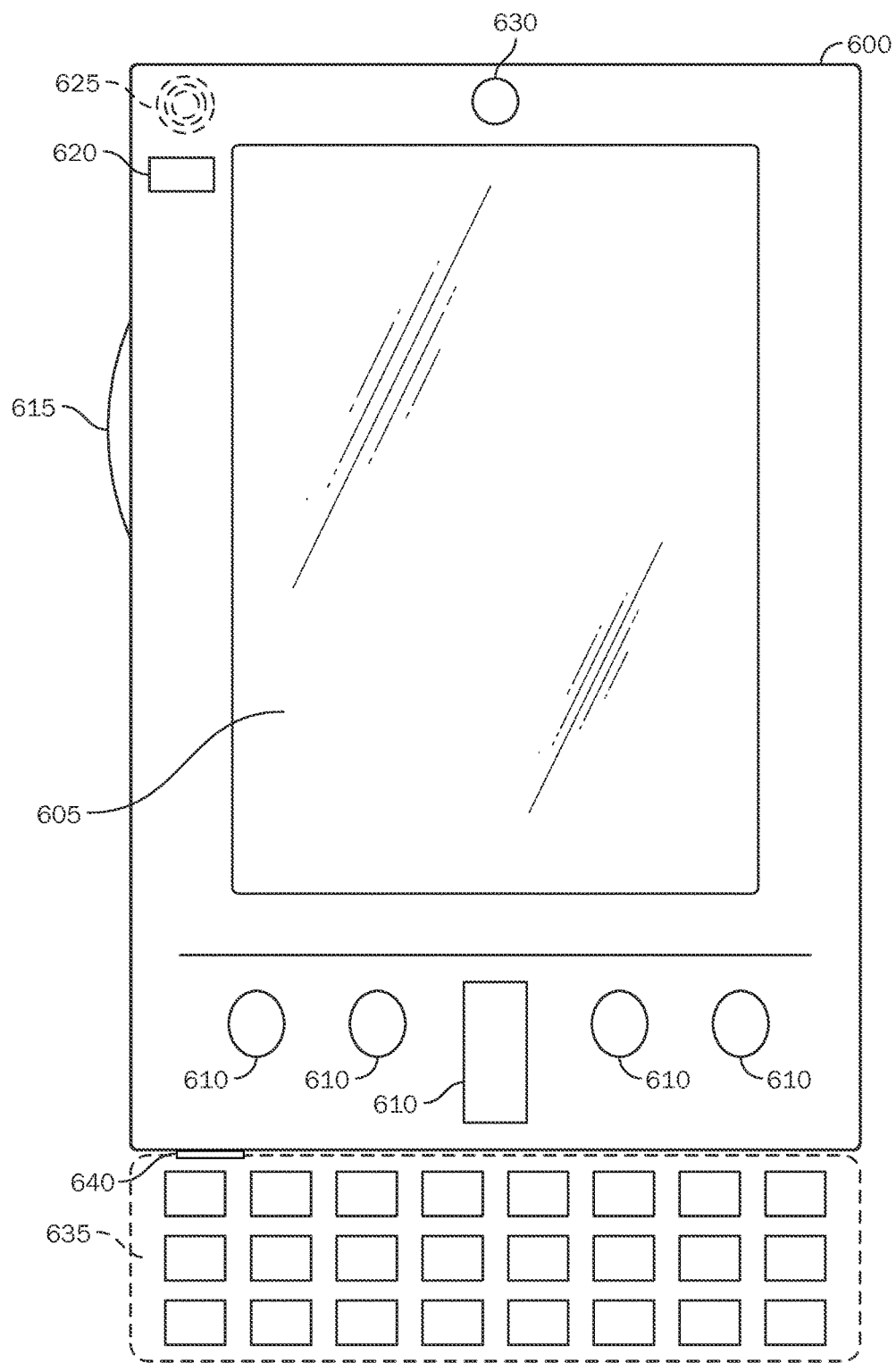
FIGS. 6A and 6B are simplified block diagrams of a mobile computing device.
Figure 6B:
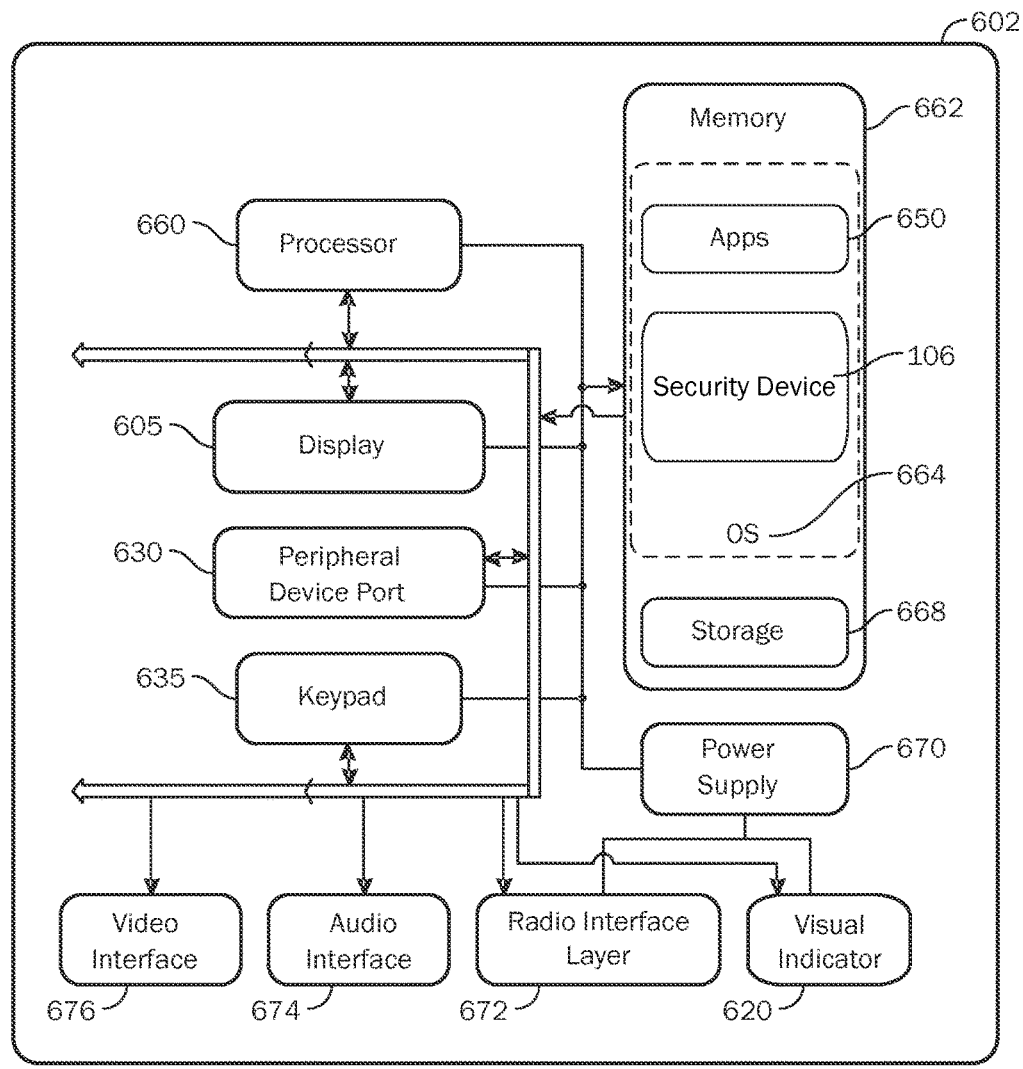
Figure 7:
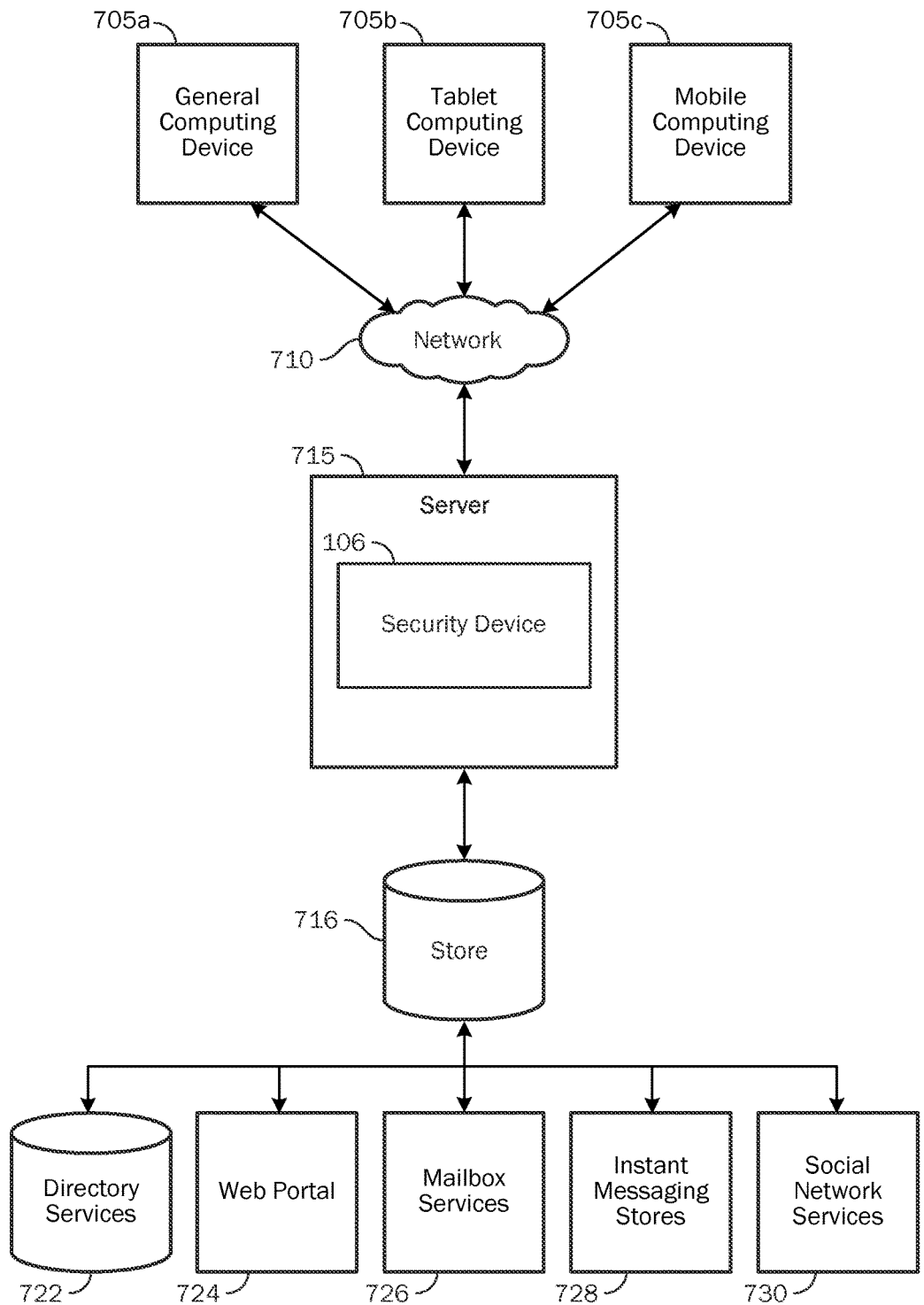
FIG. 7 is a simplified block diagram of a distributed computing system.

FIG. 5-7 and the associated descriptions provide a discussion of a variety of operating environments in which examples are practiced. However, the devices and systems illustrated and discussed with respect to FIGS. 5-7 are for purposes of example and illustration and are not limiting of a vast number of computing device configurations that are utilized for practicing aspects, described herein.

FIG. 5 is a block diagram illustrating physical components (i.e., hardware) of a computing device 500 with which examples of the present disclosure are be practiced. In a basic configuration, the computing device 500 includes at least one processing unit 502 and a system memory 504.

According to an aspect, depending on the configuration and type of computing device, the system memory 504 comprises, but is not limited to, volatile storage (e.g., random access memory), non-volatile storage (e.g., read-only memory), flash memory, or any combination of such memories. According to an aspect, the system memory 504 includes an operating system 505 and one or more programming modules 506 suitable for running software applications 550. According to an aspect, the system memory 504 includes the security device 106. The operating system 505, for example, is suitable for controlling the operation of the computing device 500. Furthermore, aspects are practiced in conjunction with a graphics library, other operating systems, or any other application program, and is not limited to any particular application or system. This basic configuration is illustrated in FIG. 5 by those components within a dashed line 508. According to an aspect, the computing device 500 has additional features or functionality. For example, according to an aspect, the computing device 500 includes additional data storage devices (removable and/or non-removable) such as, for example, magnetic disks, optical disks, or tape. Such additional storage is illustrated in FIG. 5 by a removable storage device 509 and a non-removable storage device 510.

As stated above, according to an aspect, a number of program modules and data files are stored in the system memory 504. While executing on the processing unit 502, the programming modules 506 (e.g., security device 106) perform processes including, but not limited to, one or more of the stages of the method 400 illustrated in FIG. 4. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, aspects are practiced in an electrical circuit comprising discrete electronic elements, packaged or integrated electronic chips containing logic gates, a circuit utilizing a microprocessor, or on a single chip containing electronic elements or microprocessors. For example, aspects are practiced via a system-on-a-chip (SOC) where each or many of the components illustrated in FIG. 5 are integrated onto a single integrated circuit. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of the computing device 500 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, aspects are practiced within a general purpose computer or in any other circuits or systems.

According to an aspect, the computing device 500 has one or more input device(s) 512 such as a keyboard, a mouse, a pen, a sound input device, a touch input device, etc. The output device(s) 514 such as a display, speakers, a printer, etc. are also included according to an aspect. The aforementioned devices are examples and others may be used. According to an aspect, the computing device 500 includes one or more communication connections 516 allowing communications with other computing devices 518. Examples of suitable communication connections 516 include, but are not limited to, radio frequency (RF) transmitter, receiver, and/or transceiver circuitry; universal serial bus (USB), parallel, and/or serial ports.

The term computer readable media as used herein include computer storage media. Computer storage media include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (i.e., memory storage.) According to an aspect, computer storage media includes RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. According to an aspect, any such computer storage media is part of the computing device 500. Computer storage media does not include a carrier wave or other propagated data signal.

According to an aspect, communication media is embodied by computer readable instructions, data structures, program modules, or other data in a modulated data signal, such as a carrier wave or other transport mechanism, and includes any information delivery media. According to an aspect, the term "modulated data signal" describes a signal that has one or more characteristics set or changed in such a manner as to encode information in the signal. By way of example, and not limitation, communication media includes wired media such as a wired network or direct-wired connection, and wireless media such as acoustic, radio frequency (RF), infrared, and other wireless media.

FIGS. 6A and 6B illustrate a mobile computing device 600, for example, a mobile telephone, a smart phone, a tablet personal computer, a laptop computer, and the like, with which aspects may be practiced. With reference to FIG. 6A, an example of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. According to an aspect, the display 605 of the mobile computing device 600 functions as an input device (e.g., a touch screen display). If included, an optional side input element 615 allows further user input. According to an aspect, the side input element 615 is a rotary switch, a button, or any other type of manual input element. In alternative examples, mobile computing device 600 incorporates more or less input elements. For example, the display 605 may not be a touch screen in some examples. In alternative examples, the mobile computing device 600 is a portable phone system, such as a cellular phone. According to an aspect, the mobile computing device 600 includes an optional keypad 635. According to an aspect, the optional keypad 635 is a physical keypad. According to another aspect, the optional keypad 635 is a "soft" keypad generated on the touch screen display. In various aspects, the output elements include the display 605 for showing a graphical user interface (GUI), a visual indicator 620 (e.g., a light emitting diode), and/or an audio transducer 625 (e.g., a speaker). In some examples, the mobile computing device 600 incorporates a vibration transducer for providing the user with tactile feedback. In yet another example, the mobile computing device 600 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 600 incorporates peripheral device port 640, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one example of a mobile computing device. That is, the mobile computing device 600 incorporates a system (i.e., an architecture) 602 to implement some examples. In one example, the system 602 is implemented as a "smart phone" capable of running one or more applications (e.g., browser, e-mail, calendaring, contact managers, messaging clients, games, and media clients/players). In some examples, the system 602 is integrated as a computing device, such as an integrated personal digital assistant (PDA) and wireless phone.

According to an aspect, one or more application programs 650 are loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. According to an aspect, the security device 106 is loaded into memory 662. The system 602 also includes a non-volatile storage area 668 within the memory 662. The non-volatile storage area 668 is used to store persistent information that should not be lost if the system 602 is powered down. The application programs 650 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600.

According to an aspect, the system 602 has a power supply 670, which is implemented as one or more batteries. According to an aspect, the power supply 670 further includes an external power source, such as an AC adapter or a powered docking cradle that supplements or recharges the batteries.

According to an aspect, the system 602 includes a radio 672 that performs the function of transmitting and receiving radio frequency communications. The radio 672 facilitates wireless connectivity between the system 602 and the "outside world," via a communications carrier or service provider. Transmissions to and from the radio 672 are conducted under control of the operating system 664. In other words, communications received by the radio 672 may be disseminated to the application programs 650 via the operating system 664, and vice versa.

According to an aspect, the visual indicator 620 is used to provide visual notifications and/or an audio interface 674 is used for producing audible notifications via the audio transducer 625. In the illustrated example, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. According to an aspect, the system 602 further includes a video interface 676 that enables an operation of an on-board camera 630 to record still images, video stream, and the like.

According to an aspect, a mobile computing device 600 implementing the system 602 has additional features or functionality. For example, the mobile computing device 600 includes additional data storage devices (removable and/or non-removable) such as, magnetic disks, optical disks, or tape. Such additional storage is illustrated in FIG. 6B by the non-volatile storage area 668.

According to an aspect, data/information generated or captured by the mobile computing device 600 and stored via the system 602 is stored locally on the mobile computing device 600, as described above. According to another aspect, the data is stored on any number of storage media that is accessible by the device via the radio 672 or via a wired connection between the mobile computing device 600 and a separate computing device associated with the mobile computing device 600, for example, a server computer in a distributed computing network, such as the Internet. As should be appreciated such data/information is accessible via the mobile computing device 600 via the radio 672 or via a distributed computing network. Similarly, according to an aspect, such data/information is readily transferred between computing devices for storage and use according to well-known data/information transfer and storage means, including electronic mail and collaborative data/information sharing systems.

FIG. 7 illustrates one example of the architecture of a system for monitoring the life cycle of a connection to a computer network 104 as described above. Content developed, interacted with, or edited in association with the security device 106 is enabled to be stored in different communication channels or other storage types. For example, various documents may be stored using a directory service 722, a web portal 724, a mailbox service 726, an instant messaging store 728, or a social networking site 730. The security device 106 is operable to use any of these types of systems or the like for monitoring the life cycle of a connection to a computer network 104, as described herein. According to an aspect, a server 715 provides the security device 106 to clients 705a,b,c. As one example, the server 715 is a web server providing the security device 106 over the web. The server 715 provides the security device 106 over the web to clients 705 through a network 710. By way of example, the client computing device is implemented and embodied in a personal computer 705a, a tablet computing device 705b or a mobile computing device 705c (e.g., a smart phone), or other computing device. Any of these examples of the client computing device are operable to obtain content from the store 716.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A computer-implemented method for monitoring a life cycle of a network client device on a computer network, comprising executing on a processor the steps of:
   monitoring time synchronization protocol messages associated with the computer network;
   receiving a time synchronization protocol request message sent by a network client device intended for a time server;
   determining whether the time synchronization protocol request message is associated with an initial connection event of the network client device;
   in response to making a positive determination, determining the network client device is connected to the computer network;
   determining a true identity of the network client device connecting to the computer network, wherein determining the true identity of the network client device comprises parsing the time synchronization protocol request message and extracting from the time synchronization protocol request message data corresponding to:
   a unique identifier that identifies the network client device; and
   the unique identifier identifies the network client device, wherein:
   the unique identifier identifies a relative identifier for the network client device;
   the unique identifier identifies a domain security identifier for a domain in which the network client device is grouped; and
   wherein the unique identifier identifies the true identity of the network client device;
   associating the true identity of the network client device with an internet protocol (IP) address;
   determining when the network client disconnects from the computer network based on the time synchronization protocol messages; and
   generating a report identifying the life cycle of the network client device associated with the IP address based on connection and disconnection data associated with the network client device.

2. The method of claim 1, wherein receiving an indication of a connection of a network client device to the computer network comprises:
- receiving the time synchronization protocol request message, the time synchronization protocol request message intended for a time server;
- determining whether the time synchronization protocol request message is associated with an initial connection event of the network client device; and
- in response to making a positive determination, determining the network client device is connected to the computer network.

3. The method of claim 2, wherein determining whether the time synchronization protocol request message is associated with an initial connection event of the network client device comprises:
- parsing the time synchronization protocol request message and extracting data from the time synchronization protocol request message corresponding to:
  - a value indicating a stratum level of the time server's clock in a hierarchy of time servers;
  - a timestamp indicating a time at the network client device when the time synchronization protocol request message departed the network client device for the time server; and
  - a timestamp indicating a time at the time server when the time synchronization protocol request message arrived at the time server from the network client device; and
- making a determination that the time synchronization protocol request message is associated with an initial connection event of the network client device when:
  - the value indicating the stratum level of the time server's clock is set to unspecified, invalid, or zero;
  - the timestamp indicating the time at the network client device when the time synchronization protocol request message departed the network client device for the time server is set to zero or 1.1.1970 Unix Time; and
  - the timestamp indicating the time at the time server when the time synchronization protocol request message arrived at the time server from the network client device is set to zero or 1.1.1970 Unix Time.

4. The method of claim 1, wherein determining when the network client device disconnects from the computer network comprises:
- monitoring subsequent time synchronization protocol request messages sent from the network client device according to a defined polling interval;
- determining whether a subsequent time synchronization protocol request message has not been sent from the network client device within the defined polling interval; and
- in response to making a positive determination, determining that the network client device is disconnected from the computer network.

5. The method of claim 4, further comprising determining when the network client device reconnects to the network, wherein determining when the network client device reconnects to the network comprises:
- receiving a time synchronization protocol request message from the network client device intended for a time server;
- determining that the time synchronization protocol request message is associated with an initial connection event of the network client device; and
- parsing the time synchronization protocol request message and extracting data from the time synchronization protocol request message corresponding to a timestamp indicating a time established by the time server most recently used to update an internal clock of the network client device.

6. The method of claim 5, further comprising estimating a disconnection time based on a time of a last subsequent time synchronization protocol request message sent by the network client device to the time server and the polling interval.

7. The method of claim 1, wherein determining the true identity of the network client device connecting to the computer network comprises:
- parsing the time synchronization protocol request message and extracting from the time synchronization protocol request message data corresponding to:
  - a unique identifier that identifies the network client device; and
  - a unique identifier that identifies a domain in which the network client device is grouped.

8. The method of claim 1, wherein prior to generating the report:
- analyzing at least one of:
  - the true identity of the network client device;
  - connection data associated with the network client device; and
  - disconnection data associated with the network client device; and
- determining whether there is abnormal traffic behavior associated with the network client device.

9. The method of claim 8, wherein determining whether there is abnormal traffic behavior associated with the network client device comprises at least one of:
- identifying whether a second network client device is connected to the computer network using a security token identical to a security token used by the network client device;
- identifying whether the network client device is connecting to the computer network from multiple geographically distanced networks below a minimum time threshold;
- identifying an abnormal number or frequency of connections or disconnections of the network client device from the computer network;
- identifying an abnormal number or frequency of IP address changes associated with the network client device; and
- identifying an abnormal number of network client devices associated with the IP address.

10. The method of claim 1, wherein:
- prior to generating the report, receiving a query associated with the network client device, the IP address, or the computer network; and
- generating the report comprises generating a report comprising at least one of:
  - connections associated with the network client device;
  - disconnections associated with the network client device; and
  - IP addresses associated with the network client device.

11. A system for monitoring a life cycle of a network client device on a computer network, comprising:
- one or more hardware processors for executing programmed instructions;
- memory, coupled to the one or more processors, for storing program instruction steps for execution by the one or more processors;

a security device comprising:
a network traffic listener configured to:
monitor time synchronization protocol messages associated with the computer network; and
receive a time synchronization protocol request message sent by a network client device intended for a time server;
determine whether the time synchronization protocol request message is associated with an initial connection event of the network client device;
in response to making a positive determination, determine the network client device is connected to the computer network;
a data extractor configured to extract information relating to the network client device from a time synchronization protocol request message;
a network client device identification engine configured to:
determine a true identity of the network client device connecting to the computer network, wherein to determine the true identity of the network client device comprises parsing the time synchronization protocol request message and extracting from the time synchronization protocol request message data corresponding to:
a unique identifier that identifies the network client device; and
the unique identifier identifies the network client device, wherein:
the unique identifier identifies a relative identifier for the network client device;
the unique identifier identifies a domain security identifier for a domain in which the network client device is grouped; and
wherein the unique identifier identifies the true identity of the network client device; and
associate the true identity of the network client device with an internet protocol (IP) address;
a connection monitor configured to determine when the network client device disconnects from the computer network based on the time synchronization protocol messages; and
a report generator configured to generate a report identifying the life cycle of the network client device associated with the IP address based on connection and disconnection data associated with the network client device.

12. The system of claim 11, further comprising a connection type identifier configured to determine whether the time synchronization protocol request message is associated with an initial connection event of the network client device, wherein in determining whether the time synchronization protocol request message is associated with an initial connection event, the connection type identifier is configured to:
parse the time synchronization protocol request message and extract data from the time synchronization protocol request message corresponding to:
a value indicating a stratum level of the time server's clock in a hierarchy of time servers;
a timestamp indicating a time at the network client device when the time synchronization protocol request message departed the network client device for the time server; and
a timestamp indicating a time at the time server when the time synchronization protocol request message arrived at the time server from the network client device; and make a determination that the time synchronization protocol request message is associated with an initial connection event of the network client device when:
the value indicating the stratum level of the time server's clock is set to unspecified, invalid, or zero;
the timestamp indicating the time at the network client device when the time synchronization protocol request message departed the network client device for the time server is set to zero or 1.1.1970 Unix Time; and
the timestamp indicating the time at the time server when the time synchronization protocol request message arrived at the time server from the network client device is set to zero or 1.1.1970 Unix Time.

13. The system of claim 11, wherein in determining when the network client device disconnects from the computer network, the connection monitor is configured to:
monitor subsequent time synchronization protocol request messages sent from the network client device according to a defined polling interval;
determine whether a subsequent time synchronization protocol request message has not been sent from the network client device within the defined polling interval; and
in response to making a positive determination, determine that the network client device is disconnected from the network.

14. The system of claim 11, further comprising an anomaly detection engine configured to:
analyze the connection and disconnection data; and
determine whether there is abnormal traffic behavior associated with the connection and disconnection data.

15. The system of claim 14, wherein in determining whether there is abnormal traffic behavior associated with the connection and disconnection data, the anomaly detection engine is configured to identify at least one of:
whether a second network client device is connected to the computer network using a security token identical to a security token used by the network client device;
whether the network client device is connecting to the computer network from multiple geographically distanced networks below a minimum time threshold;
an abnormal number or frequency of connections or disconnections of the network client device from the computer network;
an abnormal number or frequency of IP address changes associated with the network client device; and
an abnormal number of network client devices associated with the IP address.

16. The system of claim 11, wherein prior to generating a report comprising connection information associated with the network client device, the report generator is further configured to receive a query associated with the network client device, the IP address, or the computer network.

17. The system of claim 11, wherein the system is further configured to:
receive a query associated with the network client device, the IP address, or the computer network; and
generate the report comprises generating a report comprising at least one of:
connections associated with the network client device;
disconnections associated with the network client device; and
IP addresses associated with the network client device.

18. One or more computer storage media implemented in hardware storing computer-usable instructions that, when used by one or more computing devices, cause the one or more computing devices to perform a method for monitoring a life cycle of a network client device on a computer network, the method comprising:
- monitoring time synchronization protocol messages associated with the computer network;
- receiving a time synchronization protocol request message sent by a network client device intended for a time server;
- determining whether the time synchronization protocol request message is associated with an initial connection event of the network client device;
- in response to making a positive determination, determining the network client device is connected to the computer network;
- determining a true identity of the network client device, wherein determining the true identity of the network client device comprises parsing the time synchronization protocol request message and extracting from the time synchronization protocol request message data corresponding to:
- a unique identifier that identifies the network client device; and
- the unique identifier identifies the network client device, wherein:
- the unique identifier identifies a relative identifier for the network client device;
- the unique identifier identifies a domain security identifier for a domain in which the network client device is grouped; and
- wherein the unique identifier identifies the true identity of the network client device;
- associating the true identity of the network client device with an internet protocol (IP) address;
- determining when the network client disconnects from the computer network based on the time synchronization protocol messages; and
- generating a report identifying the life cycle of the network client device associated with the IP address based on connection and disconnection data associated with the network client device.

19. The one or more computer storage media of claim 18, wherein the method further comprises:
- monitoring subsequent time synchronization protocol request messages sent from the network client device according to a defined polling interval;
- determining whether a subsequent time synchronization protocol request message has not been sent from the network client device within the defined polling interval; and
- in response to making a positive determination, determining that the network client device is disconnected from the computer network.

20. The one or more computer storage media of claim 18, wherein the method further comprises:
- prior to generating the report, receiving a query associated with the network client device, the IP address, or the computer network; and
- generating the report comprises generating a report comprising at least one of:
- connections associated with the network client device;
- disconnections associated with the network client device; and
- IP addresses associated with the network client device.

* * * * *